(No Model.)
O. R. ROUTH.
GUIDING DEVICE FOR BRIDLES, HEADSTALLS, &c.
No. 589,859. Patented Sept. 14, 1897.
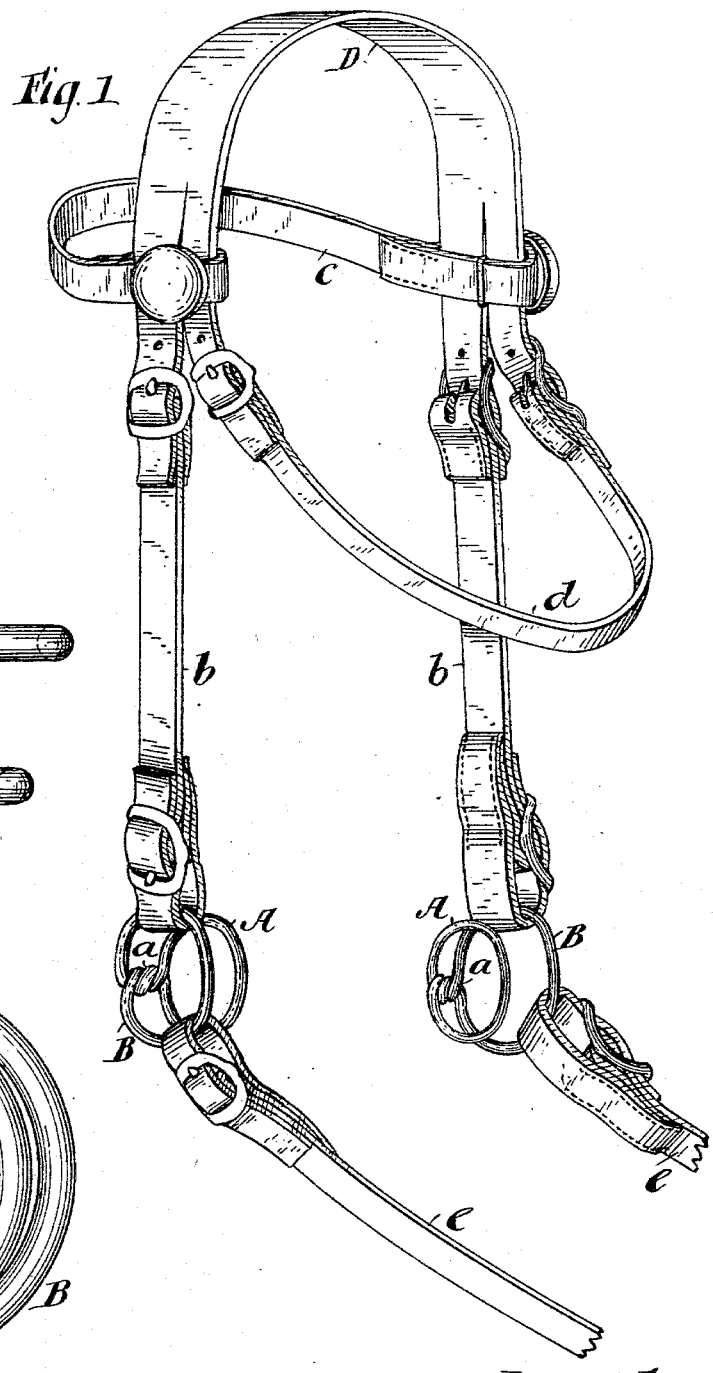

UNITED STATES PATENT OFFICE.

OSWALD R. ROUTH, OF JERSEY CITY, NEW JERSEY.

GUIDING DEVICE FOR BRIDLES, HEADSTALLS, &c.

SPECIFICATION forming part of Letters Patent No. 589,859, dated September 14, 1897.

Application filed October 29, 1895. Renewed February 12, 1897. Serial No. 623,197. (No model.)

*To all whom it may concern:*

Be it known that I, OSWALD R. ROUTH, of Jersey City, in the county of Hudson and State of New Jersey, have invented certain new and useful Improvements in Guiding Devices for Bridles, Headstalls, &c.; and I do hereby declare that the following is a full, clear, and exact description of the same, reference being had to the accompanying drawings, making a part of this specification, in which—

Figure 1 is a perspective view illustrating my invention as employed with a headstall or bridle. Fig. 2 is a top view; and Fig. 3 a side view, on a larger scale, of a device made according to my said invention.

This invention relates to that class of devices which are designed to obviate the drawbacks incident to the use of the bit ordinarily employed in headstalls, bridles, &c., for horses, mules, &c. In these the bit, when in use, is passed transversely through the mouth of the animal and rests in front of the back teeth. From this it follows that a restive animal may and often does "take the bit in his teeth," stiffening his neck and bringing practically his whole strength to resist or overcome the pull of his driver upon the reins, and thus escaping control. Another drawback to the use of the bit lies in the fact that the animal cannot masticate to any material extent with the bit in his mouth, so that the bit is customarily and necessarily removed when the animal is feeding. Among still other drawbacks to such use is the liability of the bit to wear the teeth of the animal by frictional contact therewith, thus impairing the power of grinding food and to a corresponding extent inviting impaired nutrition, with its consequent or attendant evils.

The object of my invention is to obviate these and other objections incident to the employment of the bit; and it comprises certain novel means and combination of parts whereby the animal may be guided and restrained much more effectually and with less effort than is possible when a bit is used.

In order to exercise restraint and control over the animal, it is of course requisite that means be provided for drawing or pulling upon the sensitive inner corners of the mouth. To accomplish this without the use of a bit extending through and across the mouth and without the use of a cross-bar or device for rigidly connecting the parts which bear upon the corners of the mouth, I provide two separate and independent plates or rings or equivalent flat or substantially flat devices A, which are capable of being inserted flatwise, one at each side of the mouth of the animal between the cheek and the lateral portions of one or both jaws. Attached to each of these devices A is a stem *a*, of such character as that when the device A is in the position just set forth said stem will project laterally outward at or through the adjacent inner corner of the mouth of the animal. To the outer end of each of these stems is provided means—as, for example, a ring B—for attaching the straps of the bridle or headstall to keep the devices A, when in use, from falling out of their places, and also the reins or lines by which at the will of the driver action is had upon the said devices. In the drawings the side straps are shown at *b b*, the head-bands at C and D, the throat-latch at *d*, and the reins at *e e*, these being parts of an ordinary bridle. The structure and arrangement of parts of the headstall or bridle as such may be varied within wide limits and be of any preferred or suitable construction.

It will be observed that when the devices A are placed in position as described, with their stems *a* capable of bearing in a rearward direction upon and against the inner corners of the mouth of the animal, a pull upon both the reins necessarily acts direct upon the said sensitive part of the mouth in a rearward direction, with no opportunity for any resistance to said pull. As a consequence with my invention the animal is powerless to resist and may be speedily and effectually stopped in a forward course under circumstances where otherwise the violence of the animal would be sufficient to overcome the strength and skill of the driver. In like manner when draft upon one rein is released and applied on the other the pull of the one device A upon one corner of the mouth while less force is exerted upon the other corner insures the ready turning of the animal to one side or the other at the will of the driver, and this with a very slight exercise of strength on the part of the driver and with no infliction of unnecessary pain or annoyance upon the animal. As there is no bit, bar, or like device extended across or through the mouth of the animal, the latter is unable to use his jaws in any manner capable of resisting draft upon the reins. As the two devices A have no rigid connection with each other, it follows that a pull upon one of them does not tend in any way to dislodge the other from its place. As the interior of the mouth is unobstructed, there is no hindrance to the mastication of food, and as there is nothing to come forcibly against and in frictional contact with the front surfaces of the back teeth the latter are not worn or injured, as very commonly occurs in the use of headstalls provided with a bit.

In the drawings each device A is shown as formed by an annulus or ring, the means for attaching the reins and headstall-straps to the device A as formed by another ring, and the stem $a$ by a neck connecting the two rings. My most approved construction of the apparatus is to make each device A integral with its stem $a$ and part B, which is most conveniently done by welding or otherwise joining the two ends of a piece of wire and bending the latter into the shape requisite in the parts, this being the structure represented in the drawings. As shown in the drawings, this stem is of twisted form, which affords more strength and is a more effective bearing-surface for action upon the corners of the mouth of the animal, as described. Of course the size, shape, &c., of the several parts of the apparatus may vary within wide limits so long as substantially its described structure and its essential mode of operation are preserved, and it may be of any suitable or preferred material.

What I claim as my invention is—

1. An appliance for use in a bridle comprising in combination a ring constructed to be placed between the cheek and the lateral portion of a jaw or jaws of an animal, a ring constructed to be placed outside of the cheek more or less parallel with the other and a stem connecting the two rings and constructed to bear in a rearward direction against a corner of the mouth, substantially as and for the purpose herein set forth.

2. An appliance for use in a bridle combining a ring constructed to be placed between the cheek and the lateral portion of a jaw or jaws of an animal, a ring constructed to be placed outside of the cheek more or less parallel with the other, and a stem integral with both rings and constructed to bear rearwardly against an inner corner of the mouth, substantially as and for the purpose herein set forth.

3. An appliance for use in a bridle or the like comprising a ring constructed to be placed between the cheek and a lateral portion of a jaw or jaws of an animal, a ring constructed to be placed outside of the cheek and more or less parallel therewith and a stem connecting said rings integral therewith, twisted upon itself, and arranged to bear rearwardly against a corner of the mouth of the animal when in use, substantially as and for the purpose herein set forth.

OSWALD R. ROUTH.

Witnesses:
HENRY S. READ,
M. SLOUGH.